(12) United States Patent
Shiraishi

(10) Patent No.: US 11,061,346 B2
(45) Date of Patent: Jul. 13, 2021

(54) LENS MIRROR ARRAY

(71) Applicant: TOSHIBA TEC KABUSHIKI KAISHA, Tokyo (JP)

(72) Inventor: Takashi Shiraishi, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 16/568,607

(22) Filed: Sep. 12, 2019

(65) Prior Publication Data

US 2021/0080852 A1    Mar. 18, 2021

(51) Int. Cl.
| G02B 17/00 | (2006.01) |
| G03G 15/04 | (2006.01) |
| G02B 17/08 | (2006.01) |
| G02B 3/00  | (2006.01) |

(52) U.S. Cl.
CPC ....... G03G 15/04036 (2013.01); G02B 3/005 (2013.01); G02B 17/002 (2013.01); G02B 17/08 (2013.01)

(58) Field of Classification Search
CPC .. G03G 15/04036; G02B 17/08; G02B 3/005; G02B 17/002

USPC ......................................................... 359/727
See application file for complete search history.

(56) References Cited

U.S. PATENT DOCUMENTS

| 2013/0141766 A1* | 6/2013 | Iwamatsu ............... H04N 1/03 358/475 |
| 2014/0204430 A1 | 7/2014 | Shiraishi |
| 2016/0216634 A1 | 7/2016 | Shiraishi |
| 2017/0351194 A1 | 12/2017 | Shiraishi |

OTHER PUBLICATIONS

U.S. Appl. No. 16/270,520, filed Feb. 7, 2019, Shiraishi, Takashi.

* cited by examiner

*Primary Examiner* — James C. Jones
(74) *Attorney, Agent, or Firm* — Foley & Lardner LLP

(57) ABSTRACT

A lens mirror array includes a plurality of transparent optical elements integrally connected to each other in one direction. Each of the optical elements includes: an incidence side lens surface on which light is incident; an exit side lens surface through which incident light exits; and a flange portion having a surface continuous to the incidence side lens surface. The surface of the flange portion is arranged at an angle at which unnecessary light incident on the flange portion is guided to a position deviating from an slit, the slit allowing transmission of effective light in light that exits through the exit side lens surface.

20 Claims, 13 Drawing Sheets

LENS MIRROR ARRAY

FIELD

Embodiments described herein relate generally to a lens mirror array that is incorporated into a document reading device or an exposure device of, for example, a copying machine, a multi-function peripheral, a printer, or a scanner.

BACKGROUND

Recently, a solid-state scanning type light emitting diode (LED) copying machine including an exposure optical system in which a semiconductor light emitting element is used as a light source has been widely used. An exposure device that forms an electrostatic latent image on a surface of a photoconductive drum of the LED copying machine includes a lens mirror array that refracts and reflects light based on an image signal incident from a light source to focus the light on a surface of the photoconductive drum. The lens mirror array includes, for example, a plurality of optical elements that focuses light incident from a plurality of light sources on the surface of the photoconductive drum, the light sources being arranged in a main scanning direction. The lens mirror array is formed of, for example, a transparent resin and has a structure in which a plurality of optical elements is integrally connected to each other in the main scanning direction. Each of the optical elements includes a light shielding material that is applied to a surface of the optical element to shield stray light (for example, light undesirably incident on an adjacent optical element) unnecessary for exposure.

The lens mirror array includes, for example, a flange portion that positions and fixes a lens mirror array to a housing of the LED copying machine. Since the lens mirror array is integrally formed of a transparent resin, the flange portion is also formed of a transparent resin. Therefore, unnecessary light that is undesirably incident on the flange portion may be emitted to the surface of the photoconductive drum as stray light through the optical element. This way, when stray light is emitted to the surface of the photoconductive drum, the image quality of an output image in the LED copying machine deteriorates.

DETAILED DESCRIPTION

In general, according to one embodiment, a lens mirror array includes a plurality of transparent optical elements integrally connected to each other in one direction. Each of the optical elements includes: an incidence surface on which light is incident, an exit surface through which incident light exits, and a protrusion portion having a surface continuous to the incidence surface. The surface of the protrusion portion is arranged at an angle at which unnecessary light incident on the protrusion portion is guided to a position deviating from an opening portion, the opening portion selectively allowing transmission of effective light in light that exits through the exit surface.

First Embodiment

Figure 1:
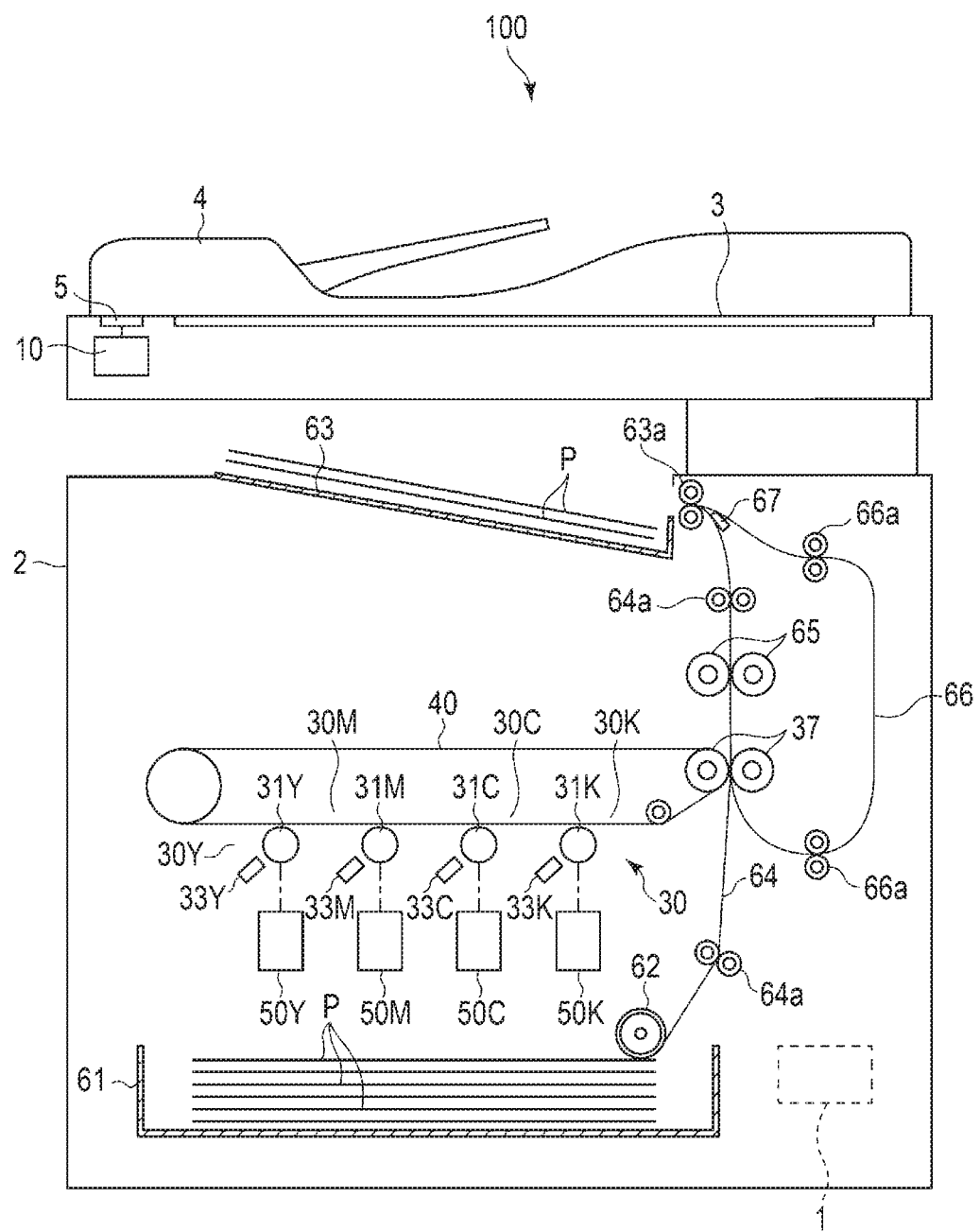
FIG. 1 is a schematic diagram illustrating a copying machine in which a lens mirror array according to a first embodiment is used.

FIG. 1 is a schematic diagram illustrating a copying machine 100 in which a lens mirror array 20 (not illustrated) according to a first embodiment is used. This copying machine 100 is, for example, a solid-state scanning type LED copying machine including an exposure optical system in which a semiconductor light emitting element such as a LED is used as a light source.

The copying machine 100 includes a housing 2. A transparent document table glass 3 on which an original document is set is provided on an upper surface of the housing 2. An automatic document feeder (ADF) 4 is provided on the document table glass 3. The ADF 4 is provided on the document table glass 3 to be openable and closable. The ADF 4 also functions to press the original document placed on the document table glass 3 and also functions to feed the original document through a document reading position (reading glass 5) described below.

Figure 2:
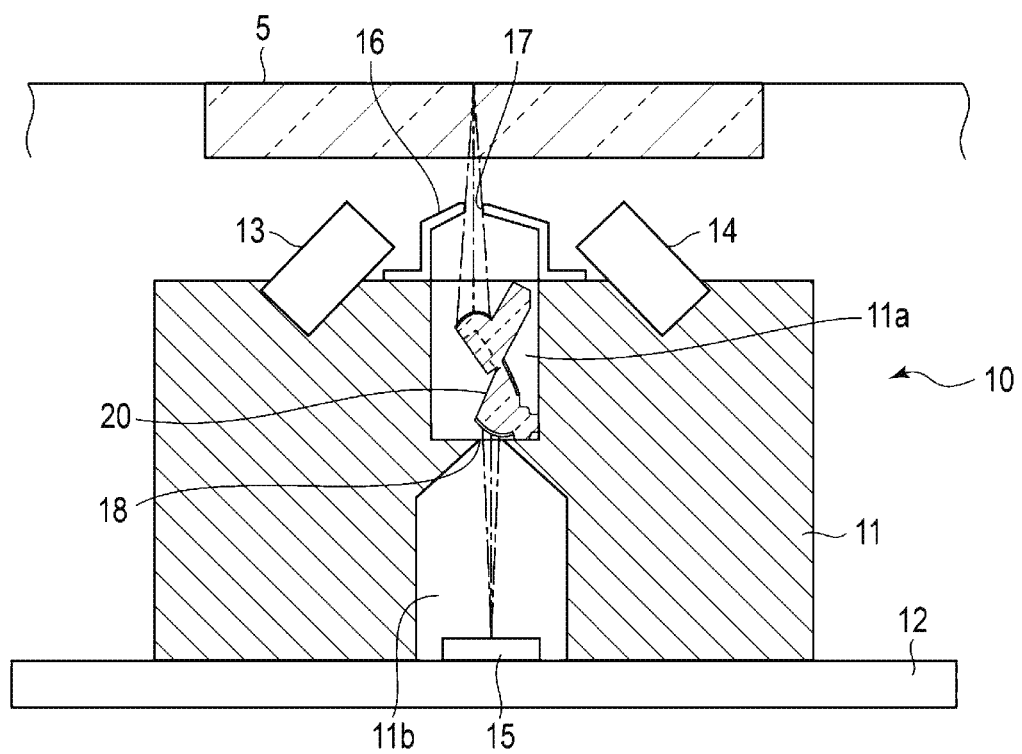
FIG. 2 is a schematic diagram illustrating a document reading device incorporated into the copying machine of FIG. 1.

A document reading device 10 is provided below the document table glass 3. FIG. 2 is a schematic diagram illustrating the document reading device 10. The document reading device 10 is provided to be movable along the document table glass 3 in a left-right direction (sub-scanning direction) in the drawing by a driving mechanism (not illustrated). In addition, the document reading device 10 is provided to be fixable to a position (position illustrated in FIG. 1) below the transparent reading glass 5 that is provided to be flush with the document table glass 3.

As illustrated in FIG. 2, the document reading device 10 includes a support 11 having a rectangular block shape. The support 11 extends in a direction (main scanning direction) that is perpendicular to a plane parallel to a rotation axis of a photoconductive drum described below. The support 11 is arranged on a substrate 12. The substrate 12 extends in the main scanning direction in a parallel posture. The substrate 12 and the support 11 are provided to be movable along the document table glass 3 in the sub-scanning direction.

Two illuminating devices 13 and 14 are provided on an upper surface of the support 11 on the document table glass 3 side (reading glass 5 side). The illuminating devices 13 and 14 extend in the main scanning direction and are provided to be separated from each other in the left-right direction (sub-scanning direction) in FIG. 2. The illuminating devices 13 and 14 move in the sub-scanning direction along with the support 11 and illuminate the original document placed on the document table glass 3. The illuminating devices 13 and 14 also illuminate the original document fed along the reading glass 5 through the reading glass 5. The illuminating devices 13 and 14 are attached to the support 11 in an inclined posture where illumination light thereof is directed to a document reading region.

The illuminating devices 13 and 14 include, for example, a light source in which a plurality of LED elements (not illustrated) is arranged in the main scanning direction. In addition, the illuminating devices 13 and 14 include a light guide (not illustrated) that extends in the main scanning direction. In addition, for example, a fluorescent tube, a xenon tube, a cold cathode ray tube, or an organic electroluminescence (EL) may also be used as the illuminating devices 13 and 14.

Figure 3:
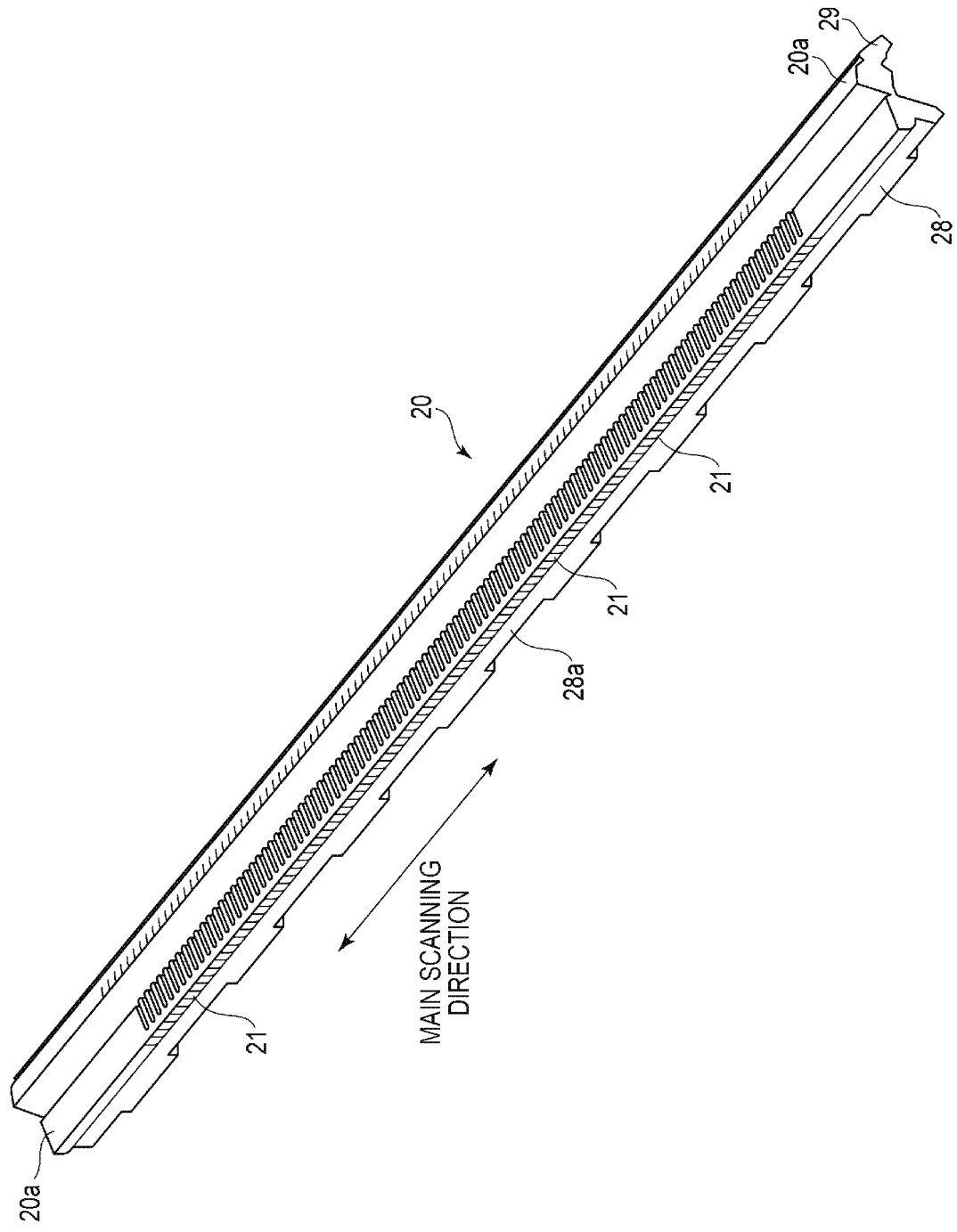
FIG. 3 is a perspective view illustrating the lens mirror array according to the first embodiment incorporated into the original document reading device of FIG. 2.

The support 11 supports the lens mirror array 20 according to the first embodiment provided adjacent to an upper surface of the support 11 and between the two illuminating devices 13 and 14. FIG. 3 is a perspective view illustrating the lens mirror array 20. The lens mirror array 20 extends in the main scanning direction and functions to form an erect image of the original document on an image sensor 15 (photoelectric conversion unit) mounted on the substrate 12. The lens mirror array 20 will be described below in detail.

The image sensor 15 is a line sensor in which a plurality of imaging elements for converting light into an electrical signal (image signal) is arranged in line. As the image sensor 15, one or more line sensors extended in the main scanning direction are provided. The imaging elements of the image sensor 15 are arranged in the main scanning direction. The image sensor 15 is configured with, for example, a charge coupled device (CCD), a complementary metal oxide semiconductor (CMOS), or another imaging element.

In addition, a light shielding member 16 is attached to the upper surface of the support 11. The light shielding member 16 extends in the main scanning direction and includes a slit 17 that allows transmission of reflected light from the original document and guides the light to the lens mirror array 20. The light shielding member 16 has a structure obtained by folding an elongated rectangular plate along a line in a longitudinal direction, and a light shielding material is applied to a surface of the light shielding member 16. The slit 17 of the light shielding member 16 functions to prevent light other than reflected light from a predetermined range of the original document from being incident on the lens mirror array 20.

In addition, the support 11 includes a slit 18 on the image sensor 15 side of the lens mirror array 20, the slit 18 extending in the main scanning direction. The support 11 includes: a chamber 11a that accommodates the lens mirror array 20 and a chamber 11b that accommodates the image sensor 15. The slit 18 is provided between the chamber 11a and the chamber 11b. The slit 18 functions as an opening portion that allows transmission of reflected light (effective light) from the original document in light exiting through the lens mirror array 20. The slit 18 extends in the main scanning direction and has a predetermined width along the sub-scanning direction. The slit 18 shields unnecessary light with an edge of the slit 18, that is, a non-opening portion so as to prevent transmission of unnecessary light (stray light) as a noise component in the light exiting through the lens mirror array 20.

When an image of the original document is read by the document reading device 10, for example, illumination light from the illuminating devices 13 and 14 is emitted to the original document through the reading glass 5. The original document is fed by the ADF 4 in a state (state illustrated in FIGS. 1 and 2) where the document reading device 10 is fixed to the position below the reading glass 5. Reflected light from the original document is incident on the lens mirror array 20 through the slit 17 of the light shielding member 16. The lens mirror array 20 reflects and focuses the reflected light from the original document as described below to exit to the image sensor 15 through the slit 18. The image sensor 15 receives the reflected light from the original document, converts the received light into an image signal by photoelectric conversion, and outputs the image signal.

At this time, an erect image of the original document that passes through the reading glass 5 through the operation of the ADF 4 is read line by line along the main scanning direction. In other words, the lens mirror array 20 forms the erect image of the reflected light from the original document on the image sensor 15. By allowing the original document to pass through the reading glass 5 in the sub-scanning direction, an image of the entire area (corresponding to a plurality of lines) of the original document can be obtained. Alternatively, when the original document is set on the document table glass 3 and the document reading device 10 is moved along the document table glass 3 in the sub-scanning direction, similarly, the erect image of the original document is read line by line along the main scanning direction. At this time, the lens mirror array 20 forms the image of the reflected light from the original document on the image sensor 15. As a result, the image of the entire area of the original document can be obtained.

As illustrated in FIG. 1, the copying machine 100 includes an image forming unit 30 provided substantially at the center in the housing 2. Along a traveling direction of an intermediate transfer belt 40, the image forming unit 30 includes a yellow image forming unit 30Y, a magenta image forming unit 30M, a cyan image forming unit 30C, and a black image forming unit 30K. The image forming units 30Y, 30M, 30C, and 30K of the respective colors have substantially the same structure. Therefore, here, the black image forming unit 30K will be described as a representative example, and the detailed description of the image forming units 30Y, 30M, and 30C of the other colors will not be repeated.

Figure 4:
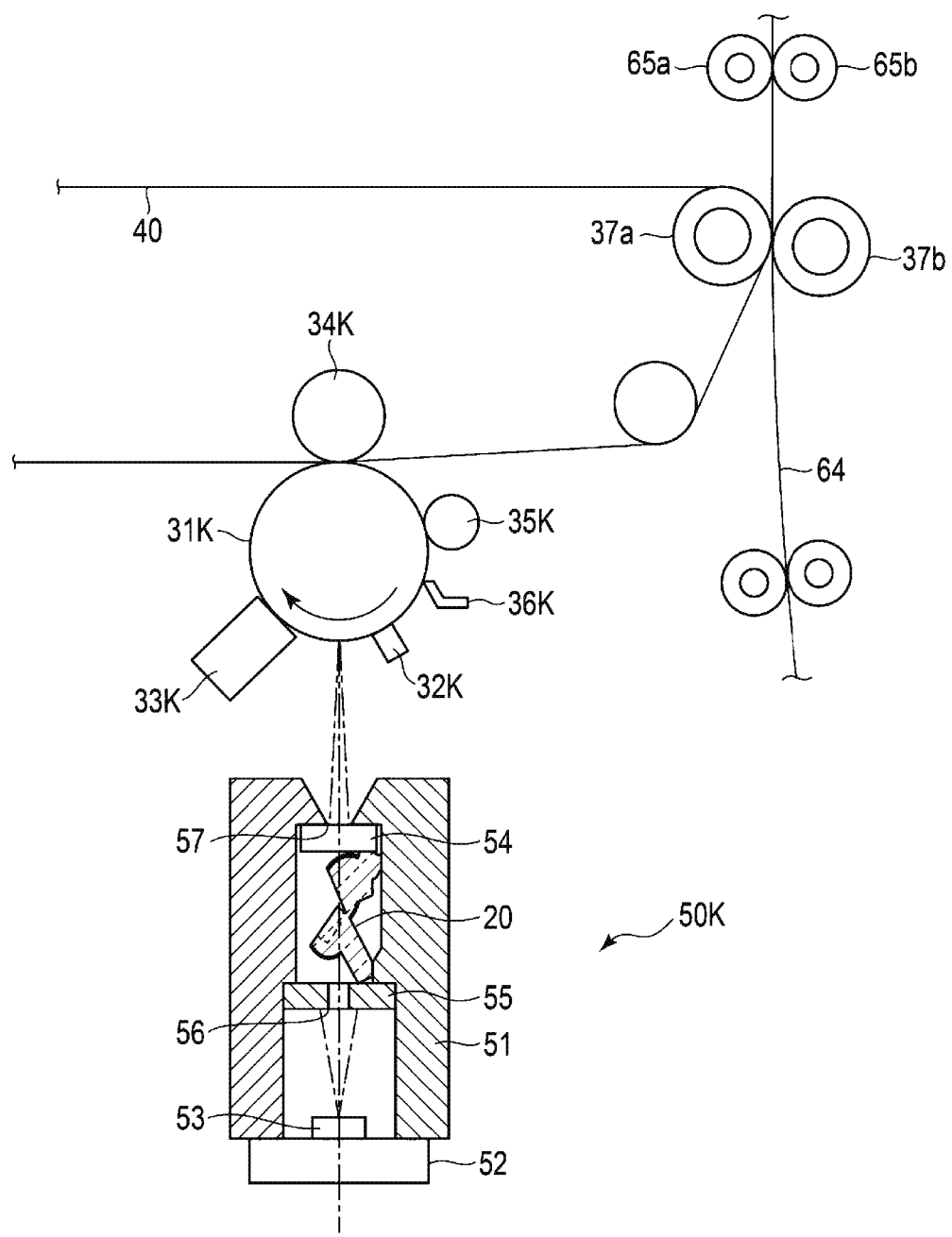
FIG. 4 is a schematic diagram illustrating an exposure device of an image forming unit incorporated into the copying machine of FIG. 1 and a peripheral structure thereof.

FIG. 4 is an enlarged schematic diagram illustrating the black image forming unit 30K and a peripheral structure thereof. The black image forming unit 30K includes, for example, a photoconductive drum 31K, an electrostatic charger 32K, an exposure device 50K, a developing unit 33K, a primary transfer roller 34K, a cleaner 35K, and a blade 36K.

The photoconductive drum 31K has a rotation axis extending in the main scanning direction and is arranged to be rotatable in a state where an outer circumferential surface thereof is in contact with a surface of the intermediate transfer belt 40. In the intermediate transfer belt 40 facing the photoconductive drum 31K, the primary transfer roller 34K is provided. The photoconductive drum 31K is rotated in a direction (clockwise direction) indicated by an arrow in the drawing at the same circumferential speed as that of the intermediate transfer belt 40 by a driving mechanism (not illustrated).

The electrostatic charger 32K uniformly charges a surface of the photoconductive drum 31K. The exposure device 50K emits exposure light based on an image signal of black separated from other color components to the surface of the photoconductive drum 31K. An electrostatic latent image based on the image signal for black is formed on the surface of the photoconductive drum 31K. The developing unit 33K supplies black toner to the electrostatic latent image formed on the surface of the photoconductive drum 31K, and forms a black toner image on the surface of the photoconductive drum 31K.

The primary transfer roller 34K layers the black toner image formed on the surface of the photoconductive drum 31K on toner images of the other colors and transfers the layered color toner images to the intermediate transfer belt 40. The cleaner 35K and the blade 36K remove the toner remaining on the surface of the photoconductive drum 31K. By the intermediate transfer belt 40 traveling, the layered color toner images transferred to the surface of the intermediate transfer belt 40 are transferred to a nip between a pair of secondary transfer rollers 37a and 37b (in the following description, collectively referred to as "secondary transfer roller pair 37").

As illustrated in FIG. 4, the exposure device 50K includes a support 51 having a rectangular block shape. The support 51 extends in the main scanning direction that is perpendicular to a plane parallel to the rotation axis of the photoconductive drum 31K, and is arranged below the photoconductive drum 31K such that they are separated from and face each other.

The support 51 supports the lens mirror array 20 having the same structure as that of the lens mirror array 20 of the document reading device 10 described above in a state the lens mirror array 20 is inverted upside down. The lens mirror array 20 extends in the main scanning direction and reflects and focuses light incident from a light source 53 as described below to exit to the surface of the photoconductive drum 31K. In the light source 53, a plurality of light emitting elements (not illustrated) is arranged in line on a surface of the substrate 52 in the main scanning direction. One or more light sources 53 extending in the main scanning direction are provided in line. The lens mirror array 20 will be described below in detail.

The light source 53 emits light based on image data (image signal) for black that is separated from other color components of image data acquired by the document reading device 10 or image data acquired through an external apparatus such as a personal computer (not illustrated). The light emitting elements of the light source 53 are an LED or an Organic Light-Emitting Diode (OLED) that is turned on or off based on the image data.

The support 51 supports a transparent protective glass 54 on the photoconductive drum 31K side of the lens mirror array 20. The protective glass 54 prevents toner, dust, or the like from being attached to the lens mirror array 20. The protective glass 54 is positioned in a state where it abuts against one end of the lens mirror array 20.

The support 51 supports a light shielding body 55 on the light source 53 side of the lens mirror array 20. The light shielding body 55 includes a slit 56 extending in the main scanning direction and, for example, a light shielding material is applied to a surface of the light shielding body 55. The light shielding body 55 shields a part of light emitted from the light source 53. The light shielding body 55 positions the lens mirror array 20 in a state where it abuts against a flange portion 28 described below of the lens mirror array 20.

In addition, the support 51 includes a slit 57 that extends in the main scanning direction to a light exit side of the protective glass 54. The slit 57 functions as an opening portion that allows transmission of light (effective light) necessary for exposure in light exiting through the lens mirror array 20. The slit 57 has a predetermined width along the sub-scanning direction. The slit 57 shields unnecessary light with an edge of the slit 57, that is, a non-opening portion so as to prevent transmission of unnecessary light (stray light) as a noise component in the light exiting through the lens mirror array 20.

The light emitted from the light source 53 passes through the slit 56 of the light shielding body 55 and is incident on the lens mirror array 20. The lens mirror array 20 reflects and focuses the light emitted from the light source 53 as described below such that the reflected and focused light exits through the lens mirror array 20. The light exiting through the lens mirror array 20 is focused on the surface of the photoconductive drum 31K through the protective glass 54 and the slit 57, the photoconductive drum 31K rotating in a direction indicated by an arrow in the drawing.

At this time, the electrostatic latent image is formed on the surface of the photoconductive drum 31K due to the rotation of the photoconductive drum 31K. The electrostatic latent image is formed line by line along the main scanning direction. When the photoconductive drum 31K rotates by a given amount, the electrostatic latent image for black that is separated from other color components according to the entire image of the original document is formed on the surface of the photoconductive drum 31K.

As illustrated in FIG. 1, the copying machine 100 includes the secondary transfer roller pair 37 that transfers the layered color toner images transferred to the surface of the intermediate transfer belt 40 to the paper P. As illustrated in FIG. 4, the secondary transfer roller 37a is arranged inside the intermediate transfer belt 40, and the intermediate transfer belt 40 is supported by the secondary transfer roller 37a. The secondary transfer roller 37b is provided to face the secondary transfer roller 37a with the intermediate transfer belt 40 interposed therebetween. The layered color toner images transferred to the surface of the intermediate transfer belt 40 are transferred to a nip of the secondary transfer roller pair 37 by the intermediate transfer belt 40 traveling.

On the other hand, a paper feed cassette 61 that accommodates plural sheets of paper P having a predetermined size overlapping each other is provided near a lower end in the housing 2 of the copying machine 100. The paper feed cassette 61 is provided to be withdrawn and stored through a front surface of the housing 2. A pickup roller 62 is arranged above a right end (in drawing) of the paper feed cassette 61. The pickup roller 62 picks up the paper P on the uppermost end in the overlapping direction among plural sheets of paper P accommodated in the paper feed cassette 61. The pickup roller 62 picks up the paper P one by one by bringing a circumferential surface thereof into contact with the paper P and rotating the paper P.

A paper discharge tray 63 is provided in an upper region of the housing 2. The paper discharge tray 63 is arranged below the document table glass 3. The paper discharge tray 63 discharges the paper P on which the image is formed into a body of the copying machine 100. A conveyance path 64 extends between the pickup roller 62 and the paper discharge tray 63. The paper P picked up from the paper feed cassette 61 is horizontally conveyed to the paper discharge tray 63 through the conveyance path 64. The conveyance path 64 extends through the nip of the secondary transfer roller pair 37 and includes a plurality of conveyance roller pairs 64a and a conveyance guide (not illustrated). A paper discharge roller pair 63a for discharging the paper P to the paper discharge tray 63 is provided at a terminal of the conveyance path 64. The paper discharge roller pair 63a can rotate in both forward and reverse directions.

A fixing roller pair 65 is provided on a conveyance path 64 on a downstream side (upper side in the drawing) of the secondary transfer roller pair 37. The fixing roller pair 65 heats and compresses the paper p conveyed through the conveyance path 64 and fixes the toner image transferred to the surface of the paper P to the surface of the paper P.

The copying machine 100 includes an inverse conveyance path 66 for inverting front and back surfaces of the paper P having one surface on which the image is formed and conveying the inverted paper P to the nip of the secondary transfer roller pair 37. The inverse conveyance path 66 includes a plurality of conveyance roller pairs 66a and a conveyance guide (not illustrated), the conveyance roller pair picking up and rotating the paper P to convey the paper P. A gate 67 that switches a conveyance destination of the paper P between the conveyance path 64 and the inverse conveyance path 66 is provided upstream of the paper discharge roller pair 63a.

When the pickup roller 62 is rotated such that the paper P is picked up from the paper feed cassette 61, the paper P is conveyed to the paper discharge tray 63 through the conveyance path 64 by the conveyance roller pairs 64a. At this time, the layered color toner images formed on the surface of the intermediate transfer belt 40 are transferred to the nip of the secondary transfer roller pair 37 at a conveyance timing of the paper P, and the color toner images are transferred to the surface of the paper P by a transfer voltage applied from the secondary transfer roller pair 37.

The paper P to which the toner images are transferred is heated and compressed by passing through the fixing roller pair 65, the toner images are fused and pressed against the surface of the paper P, and the toner images are fixed to the paper P. The paper P on which the image is formed is discharged to the paper discharge tray 63 through the paper discharge roller pair 63a.

At this time, when the copying machine 100 selects a duplex printing mode where an image is also formed on the back surface of the paper P, the gate 67 is switched to the inverse conveyance path 66 at a timing immediately before a rear end in a discharge direction of the paper P discharged to the paper discharge tray 63 passes the nip of the paper discharge roller pair 63a.

The paper discharge roller pair 63a is inverted, and the paper P is switched back and conveyed. As a result, the rear end of the paper P is directed to the inverse conveyance path 66, the front and back surfaces of the paper P are inverted, and the inverted paper P is conveyed to the nip of the secondary transfer roller pair 37.

At this time, the toner image based on the image data to be formed on the back surface of the paper P is formed on the surface of the intermediate transfer belt 40, and the intermediate transfer belt 40 on which the color toner images are formed travels such that the color toner images are transferred to the nip of the secondary transfer roller pair 37. The toner images are transferred and fixed to the back surface of the inverted paper P, and the paper P is discharged to the paper discharge tray 63 through the paper discharge roller pair 63a.

As illustrated in FIG. 1, the copying machine 100 includes a controller 1 that controls the operation of each of the above-described mechanisms. The controller 1 includes a processor such as a central processing unit (CPU) and a memory. The controller 1 executes various processing functions by the processor executing a program stored in the memory. The controller 1 controls the document reading device 10 such that an image is acquired from the original document. In addition, the controller 1 controls the image forming unit 30 such that the image is formed on the surface of the paper P. For example, the controller 1 inputs image data read from the document reading device 10 to the image forming unit 30. The controller 1 controls the operations of the conveyance roller pairs 64a and 66a such that the paper P is conveyed through the conveyance path 64 and the inverse conveyance path 66.

Figure 5:
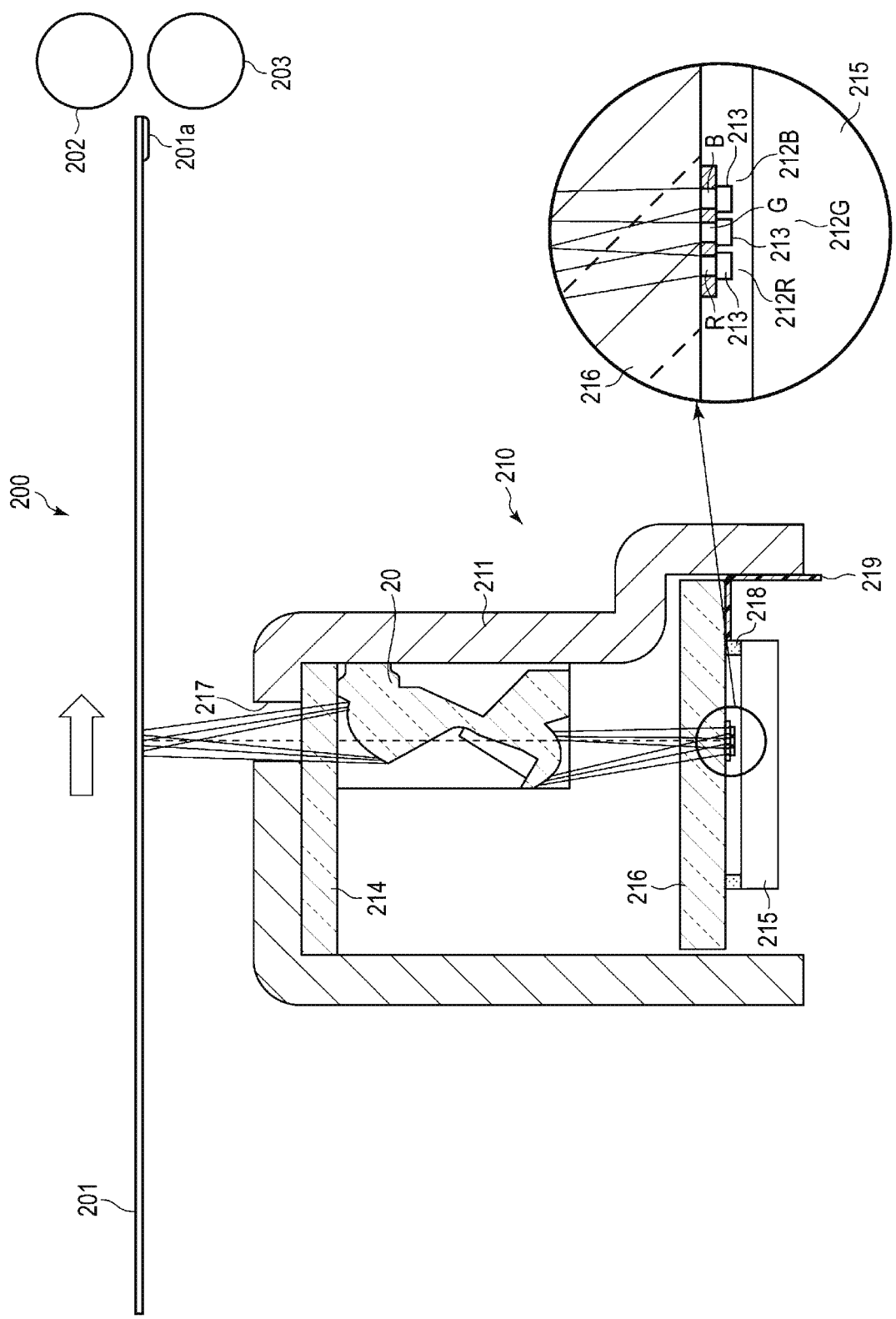
FIG. 5 is a schematic diagram illustrating major parts of a printer in which the lens mirror array is used.

FIG. 5 is a schematic diagram illustrating major parts of a printer 200 in which the lens mirror array 20 having the same structure as that of the above-described lens mirror array 20 is used. The printer 200 is, for example, a printer that is incorporated into an instant camera or a printer for instant photography that develops an image obtained by a digital camera or the like.

The printer 200 includes a conveyance mechanism (not illustrated) that conveys a photosensitive medium 201 such as a silver halide film in a direction (right direction in FIG. 5) indicated by an arrow in the drawing. The photosensitive medium 201 is conveyed by a conveyance mechanism in a horizontal posture. The photosensitive medium 201 includes an accommodation portion 201a that is provided on a distal side in a conveying direction and accommodates a developer. A pair of pressing rollers 202 and 203 that presses the photosensitive medium 201 to break the accommodation portion 201a is provided on a conveyance path through which the photosensitive medium 201 is conveyed. The pair of pressing rollers 202 and 203 has a length exceeding a width in a direction perpendicular to the conveying direction of the photosensitive medium 201.

The photosensitive medium 201 is conveyed through a nip between the pair of pressing rollers 202 and 203. At least one of the pressing rollers 202 and 203 is biased in a direction moving toward the other one of the pressing rollers 202 and 203. Therefore, the photosensitive medium 201 to be conveyed through the nip between the pair of pressing rollers 202 and 203 is conveyed while being compressed by the pair of pressing rollers 202 and 203. As a result, the accommodation portion 201a of the photosensitive medium 201 is compressed and broken by the pair of pressing rollers 202 and 203, and then the photosensitive medium 201 is further conveyed such that the developer is spread across the entire surface of the photosensitive medium 201.

An exposure device 210 is arranged below (in the drawing) the conveyance path through which the photosensitive medium 201 is conveyed such that they are separated from and face each other. The exposure device 210 emits exposure light of three colors (RGB) into which color components of image data are separated to a photosensitive surface of the photosensitive medium 201 conveyed through the conveyance path such that color latent images are formed on the photosensitive medium 201. The exposure device 210 is arranged upstream of the pair of pressing rollers 202 and 203 along the conveyance path.

The exposure device 210 includes a support 211 that extends in a width direction (direction perpendicular to the plane in the drawing) perpendicular to the conveying direction of the photosensitive medium 201. The support 211 supports the lens mirror array 20 having substantially the same structure as that of the above-described lens mirror array 20. The lens mirror array 20 extends in the width direction perpendicular to the plane in the drawing, reflects and focuses light incident from light sources 212R, 212G, and 212B as described below to exit to the photosensitive surface of the photosensitive medium 201. The lens mirror array 20 will be described below in detail.

Each of the light sources 212R, 212G, and 212B is an OLED in which two rows of filters and two rows of apertures for each color are staggeredly arranged with respect to a white organic EL element 213. The white organic EL element 213 is attached to a transparent glass 216. In addition, the OLED is isolated from outdoor air by the transparent glass 216, a sealing plate 215, and an adhesive 218 and is protected from moisture absorption. The adhesive 218 is applied in a frame shape to an outer circumference of the sealing plate 215 and seals a space between the transparent glass 216 and the sealing plate 215. The white organic EL element 213 is connected to a flexible substrate 219 and supplies power to a circuit on the flexible substrate 219. The support 211 supports the transparent glass 216 between the lens mirror array 20 and the light sources 212R, 212G, and 212B.

In addition, the support 211 supports a transparent protective glass 214 on the photosensitive medium 201 side of the lens mirror array 20. The protective glass 214 protects the lens mirror array 20 and prevents dust from being attached to the lens mirror array 20. The protective glass 214 is positioned in a state where it abuts against one end of the lens mirror array 20.

The support 211 includes a slit 217 that extends in the width direction to a light exit side of the protective glass 214. The slit 217 functions as an opening portion that allows transmission of light (effective light) necessary for exposure in light exiting through the lens mirror array 20. The slit 217 has a predetermined width along the sub-scanning direction. The slit 217 shields unnecessary light with an edge of the slit 217, that is, a non-opening portion so as to prevent transmission of unnecessary light (stray light) as a noise component in the light exiting through the lens mirror array 20.

When an image is formed on the photosensitive surface of the photosensitive medium 201 by the printer 200, the photosensitive medium 201 is conveyed by the conveyance mechanism, and light is emitted from the light sources 212R, 212G, and 212B to the photosensitive medium 201 through the lens mirror array 20. As a result, the color latent images are formed on the photosensitive surface of the photosensitive medium 201. When the photosensitive medium 201 is further conveyed, the photosensitive medium 201 is compressed by the pair of pressing rollers 202 and 203, and the accommodation portion 201a of the photosensitive medium 201 is broken. As a result, the developer is supplied to the photosensitive surface of the photosensitive medium 201. The color latent images of the photosensitive medium 201 are developed, and the color images are formed on the photosensitive medium 201.

Figure 6:
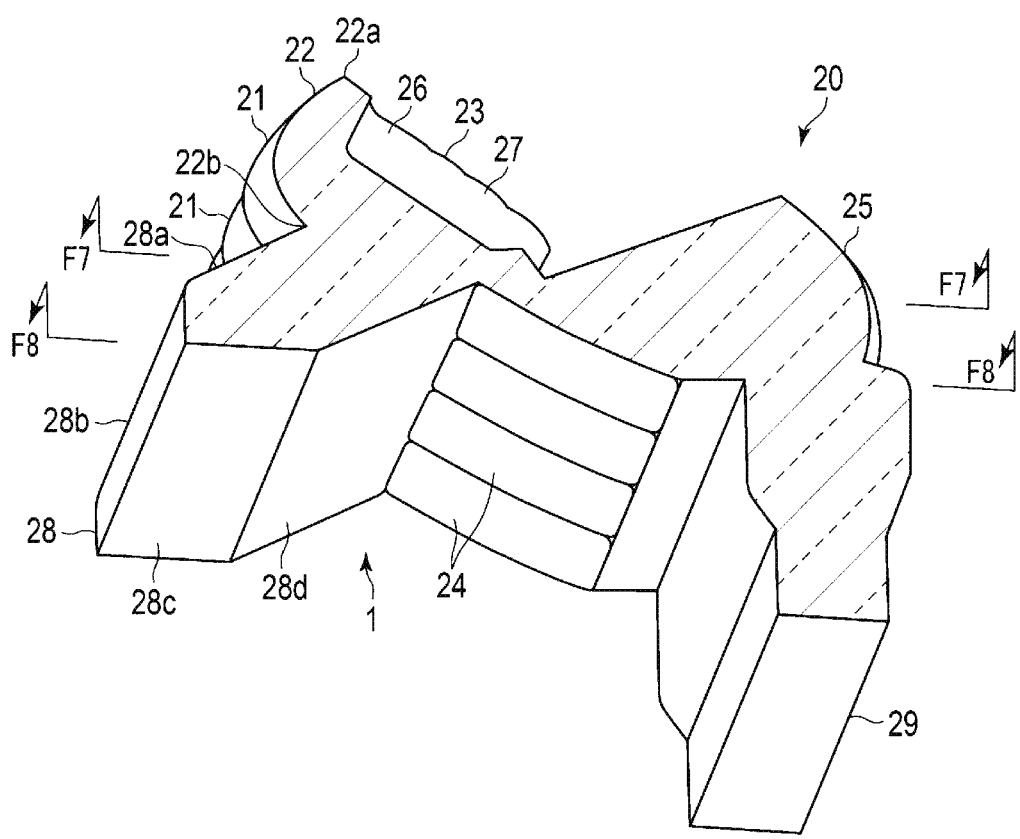
FIG. 6 is a partially enlarged perspective view illustrating a part of the lens mirror array of FIG. 3.
Figure 7:
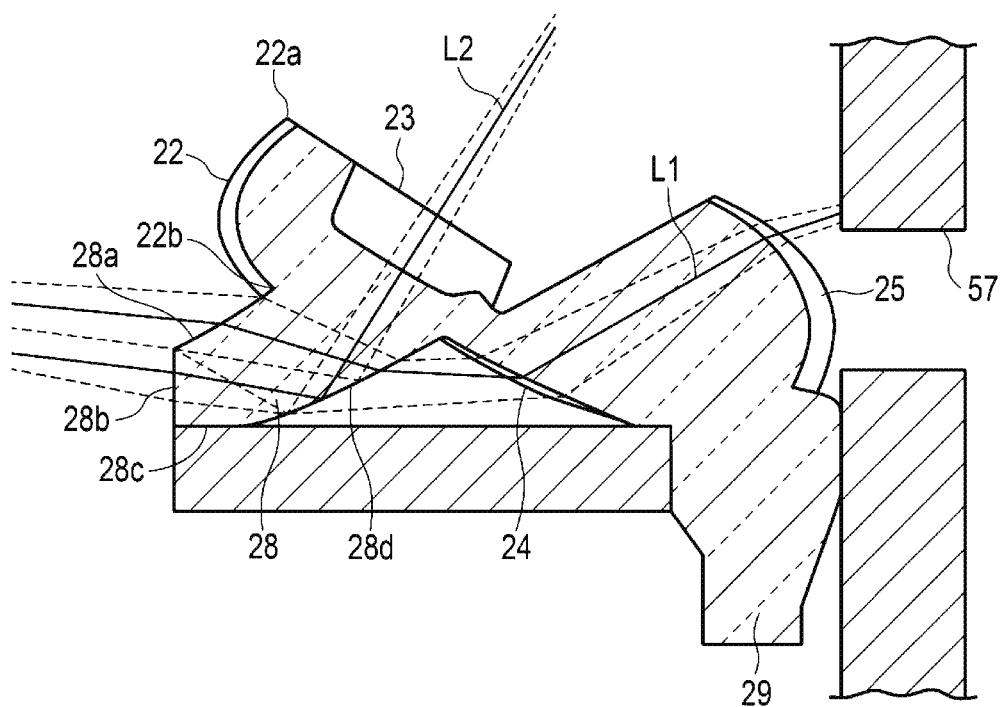
FIG. 7 is a cross-sectional view taken along line F7-F7 of the lens mirror array of FIG. 6.
Figure 8:
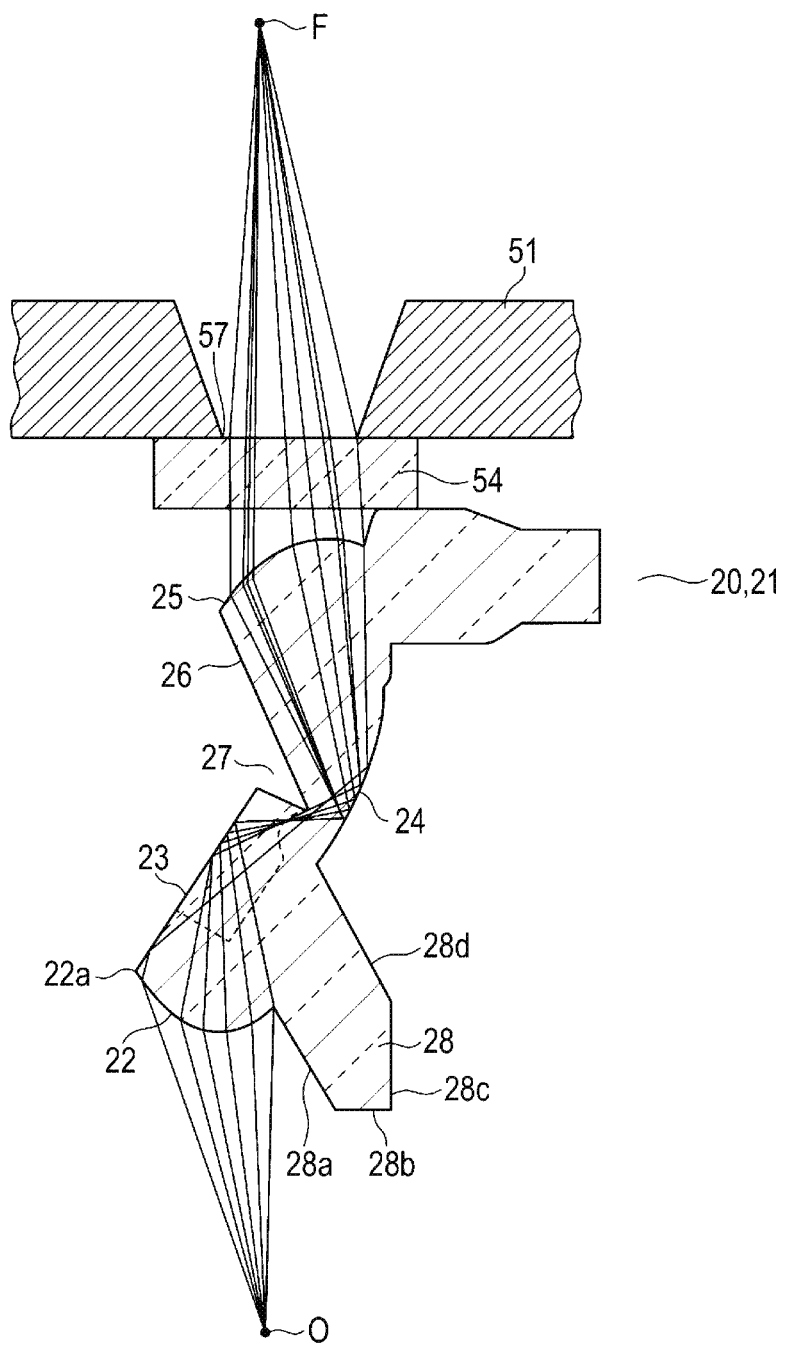
FIG. 8 is a cross-sectional view taken along line F8-F8 of the lens mirror array of FIG. 6 illustrating an optical path of light that passes through the lens mirror array.

Hereinafter, the above-described lens mirror array 20 will be described using FIGS. 3, 6, 7, and 8. FIG. 3 is an appearance perspective view illustrating the lens mirror array 20, and FIG. 6 is a partially enlarged perspective view illustrating the lens mirror array 20. FIG. 7 is a cross-sectional view of the lens mirror array 20 taken along a surface that is provided between two adjacent optical elements 21 and is perpendicular to a longitudinal direction. FIG. 8 is a cross-sectional view of the lens mirror array 20 taken along a surface that passes the center of one optical element 21 of the lens mirror array 20 in the main scanning direction and is perpendicular to the longitudinal direction of the lens mirror array 20.

The lens mirror array 20 is incorporated into each of the document reading device 10 and exposure devices 50Y, 50M, 50C, and 50K of the copying machine 100 in a posture where the longitudinal direction is parallel to the main scanning direction. In addition, the lens mirror array 20 is incorporated into the printer 200 in a posture where the longitudinal direction is parallel to the main scanning direction. The lens mirror array 20 has a structure in which a plurality (only four in FIG. 6) of transparent optical elements 21 having substantially the same shape are arranged in the main scanning direction and integrated.

In addition, in addition to the optical elements 21, the lens mirror array 20 includes an extending portion 20a that is provided at opposite ends in the longitudinal direction thereof and can be grasped by an operator with fingers. In the embodiment, the lens mirror array 20 is formed by integral molding of a transparent resin. The lens mirror array 20 may be formed of glass.

As illustrated in FIG. 8, each of the optical elements 21 of the lens mirror array 20 guides diffused light from an object point O to image the light to an image forming point F. Light is incident on one optical element 21 from a plurality of object points O arranged in the main scanning direction, and light incident from a predetermined object point range exits through the optical element 21. For example, light from the object point O arranged in a width that is two times to three times a pitch of the optical elements 21 in the main scanning direction exits from one optical element 21. The incident light is reflected twice from each of the optical elements 21 of the lens mirror array 20 and exits there through to form an erect image of the object point O at the image forming point F.

For example, when the document reading device 10 illustrated in FIG. 2 is incorporated into the lens mirror array 20, the optical elements 21 image the reflected light from the original document on a light receiving surface of the image sensor 15. In addition, when the lens mirror array 20 is incorporated into the exposure device 50K illustrated in FIG. 4, the optical elements 21 image the light emitted from the light source 53 on the surface of the photoconductive drum 31K. In addition, for example, when the lens mirror array 20 is incorporated into the printer 200 illustrated in FIG. 5, the optical elements 21 image the light emitted from the light sources 212R, 212G, and 212B on the photosensitive surface of the photosensitive medium 201. Hereinafter, the structure and the function of each of the optical elements 21 will be described using the lens mirror array 20 incorporated into the exposure device 50K as an example.

As illustrated in FIGS. 6 to 8, each of the optical elements 21 of the lens mirror array 20 includes, on a surface, an incidence side lens surface 22 (incidence surface, first lens surface), an upstream side reflection surface 23 (first reflection surface), a downstream side reflection surface 24 (second reflection surface), and an exit side lens surface 25 (exit surface, second lens surface). The incidence side lens surface 22, the downstream side reflection surface 24, and the exit side lens surface 25 are outwardly convex surfaces. The upstream side reflection surface 23 is a flat surface. A ridge 22a that extends substantially along the longitudinal direction of the lens mirror array 20 is provided between the incidence side lens surface 22 and the upstream side reflection surface 23. An imaginary boundary surface (cross-section of FIG. 7) between two optical elements 21 adjacent to each other in the longitudinal direction is substantially perpendicular to the respective surfaces 22, 23, 24, and 25.

The respective surfaces 22, 23, 24, and 25 of the optical element 21 are substantially parallel to the longitudinal direction of the lens mirror array 20. That is, in the lens mirror array 20 in which the optical elements 21 are integrally connected to each other in the longitudinal direction, the respective surfaces 22, 23, 24, and 25 of the optical element 21 are continuous surfaces connected to each other in the longitudinal direction. The lens mirror array 20 incorporated into the exposure device 50K is attached to the support 51 in a posture where the incidence side lens surfaces 22 of the optical elements 21 face the light source 53.

As illustrated in FIG. 8, focusing on one optical element 21, the diffused light from the light source 53 positioned at the object point O is incident on the incidence side lens surface 22. The incidence side lens surface 22 converges the incident diffused light and forms an intermediate inverted image. The upstream side reflection surface 23 that is continuous to the incidence side lens surface 22 through the ridge 22a reflects the light incident through the incidence side lens surface 22 toward the downstream side reflection surface 24 by total reflection or Fresnel reflection.

The downstream side reflection surface 24 reflects the light reflected from the upstream side reflection surface 23 toward the exit side lens surface 25 by total reflection or Fresnel reflection. The downstream side reflection surface 24 may be formed with a flat surface. The light reflected from the downstream side reflection surface 24 exits through the exit side lens surface 25 toward the surface of the photoconductive drum 31K arranged at the image forming point F. The exit side lens surface 25 combines with the downstream side reflection surface 24 to form an erect image as an inverted image of the intermediate inverted image formed by the incidence side lens surface 22. The light exiting through the exit side lens surface 25 forms an image on the surface of the photoconductive drum 31K arranged at the image forming point F.

A light shielding material 26 (refer to FIG. 6) is applied to the surface of the optical element 21. The light shielding material 26 is applied to the surface of the optical element 21 using a dispenser, an ink jet head, or the like. The light shielding material 26 is, for example, an ink (for example, carbon black or an ultraviolet (UV) ink including a light shielding material such as a pigment or a dye) having high light shielding properties that includes a polymer having substantially the same refractive index as the lens mirror array 20 as a base. The light shielding material 26 prevents light transferred through the lens mirror array 20 from being reflected and from exiting to the outside of the lens mirror array 20.

The respective upstream side reflection surfaces 23 of the optical elements 21 adjacent to each other in the longitudinal direction of the lens mirror array 20 are connected such that end portions on the ridge 22a side close to the incidence side lens surface 22 are flush with each other. In other words, a comb-shaped groove 27 that divides the reflection surface is provided between the upstream side reflection surfaces 23 of the optical elements 21. The groove 27 is formed to surround end portions of the upstream side reflection surfaces 23 distant from the incidence side lens surfaces 22 and regulates one end of the exit side lens surface 25. The groove 27 is provided in the vicinity of the upstream side reflection surface 23 excluding the ridge 22a.

The light shielding material 26 is applied to the entire surface of the comb-shaped groove 27. The light shielding material 26 is injected into the groove 27, for example, using a dispenser and is applied to an inner surface of the groove 27 using a capillary phenomenon, wetting, or the like of the groove 27. This way, when the light shielding material 26 is applied to the inner surface of the groove 27 using a capillary phenomenon, wetting, or the like, an appropriate amount of the light shielding material 26 can be continuously and rapidly applied, the operation can be made simple, and the light shielding material 26 can be uniformly applied to each of the optical elements 21. In other words, in the embodiment, the light shielding material 26 is not applied to the surface (in particular, the upstream side reflection surface 23) of the lens mirror array 20 other than the groove 27.

In addition, the lens mirror array 20 includes two flange portions 28 and 29 over the entire length. Opposite ends of each of the flange portions 28 and 29 in a longitudinal direction are included in the extending portion 20a described above. As illustrated in FIGS. 6 and 7, the incidence side flange portion 28 (protrusion portion) is provided between the incidence side lens surfaces 22 and the downstream side reflection surfaces 24 of the optical elements 21. The incidence side flange portion 28 is provided to protrude outward from a gap between the incidence side lens surfaces 22 continuous to each other in the longitudinal direction and the downstream side reflection surfaces 24 continuous to each other in the longitudinal direction.

In addition, the exit side flange portion 29 is provided between the downstream side reflection surfaces 24 and the exit side lens surfaces 25 of the optical elements 21. The exit side flange portion 29 is provided to protrude outward from a gap between the downstream side reflection surfaces 24 continuous to each other in the longitudinal direction and the exit side lens surfaces 25 continuous to each other in the longitudinal direction.

The flange portions 28 and 29 are designed for positioning or attaching the lens mirror array 20. For example, in the lens mirror array 20 incorporated into the exposure device 50K, one flange portion 28 corresponds to the light shielding body 55, and the other flange portion 29 corresponds to the protective glass 54. This way, by using the flange portions 28 and 29, the lens mirror array 20 can be positioned and attached to the support 51.

For example, as illustrated in FIG. 4, when the lens mirror array 20 is incorporated into the exposure device 50K, the light emitted from the light source 53 is incident on the incidence side lens surface 22 of the lens mirror array 20 through the slit 56 of the light shielding body 55. However, when there is a deviation or an error from a set value in the width of the slit 56 or the attachment position of the lens mirror array 20, a part of light passed through the slit 56 may be incident on the incidence side flange portion 28. The flange portion 28 is a part of the lens mirror array 20 and is formed of a transparent material. Therefore, there may be a case where unnecessary light incident on the flange portion 28 exits through flange portion 28, is incident again on the lens mirror array 20 from the outside of the lens mirror array 20 through the downstream side reflection surface 24, and exits through the exit side lens surface 25 as stray light.

When the lens mirror array 20 is incorporated into the exposure device 50K, this stray light is emitted to the surface of the photoconductive drum 31K, becomes noise of the electrostatic latent image formed on the photoconductive drum 31K, and causes deterioration in image quality. In addition, when the lens mirror array 20 is incorporated into the document reading device 10, the stray light is incident on the image sensor 15 and causes deterioration in the image quality of a read image. In addition, when the lens mirror array 20 is incorporated into the printer 200, the stray light is incident on the photosensitive medium 201 and causes deterioration in the image quality of an image to be output.

Accordingly, in the embodiment, in order to remove the stray light, a fourth surface 28d described below of the incidence side flange portion 28 is curved and arranged at a predetermined angle. Hereinafter, focusing on one optical element 21, a desired example of a shape and an arrangement angle of the fourth surface 28d of the incidence side flange portion 28 will be described.

The incidence side flange portion 28 includes first to fourth surfaces 28a, 28b, 28c, and 28d. The first surface 28a (first surface) is a flat surface that extends in the main scanning direction and is continuous to an edge 22b of the incidence side lens surfaces 22 opposite to the ridges 22a, the incidence side lens surfaces 22 being continuous to each other in the main scanning direction. The second surface 28b is a flat surface that extends in the main scanning direction and is continuous to an edge of the first surface 28a opposite to the incidence side lens surface 22. The third surface 28c is a flat surface that extends in the main scanning direction and is continuous to an edge of the second surface 28b opposite to the first surface 28a. The fourth surface 28d (second surface) is a flat surface that extends in the main scanning direction and is continuous to an edge of the third surface 28c opposite to the second surface 28b. An edge of the fourth surface 28d opposite to the third surface 28c is continuous to the downstream side reflection surfaces 24 continuous to each other in the main scanning direction.

As indicated by solid line L1 in FIG. 7, the unnecessary light incident on the flange portion 28 through the first surface 28a is refracted from the first surface 28a, passes through the flange portion 28, is refracted from the fourth surface 28d, and exits through the flange portion 28. This way, substantially the entire light exiting from the flange portion 28 through the fourth surface 28d is refracted through the downstream side reflection surface 24, is incident again on the optical element 21, passes through the optical element 21, and is refracted and exits through the exit side lens surface 25.

In addition, as indicated by solid line L2 in FIG. 7, the unnecessary light incident on the flange portion 28 through the second surface 28b is refracted from the second surface 28b, passes through the flange portion 28, is reflected from the fourth surface 28d, and exits from the optical element 21 through the upstream side reflection surface 23. That is, in the embodiment, the fourth surface 28d of the flange portion 28 is arranged at an angle at which the light incident through the first surface 28a is refracted and the light incident through the second surface 28b is reflected.

In other words, in the embodiment, the first surface 28a and the fourth surface 28d of the flange portion 28 are arranged at a predetermined angle such that the unnecessary light incident on the flange portion 28 through the first surface 28a is guided to a position deviating from the slit 57 of the support 51 along the path L1 described above. In the embodiment, the second surface 28b and the fourth surface 28d of the flange portion 28 are arranged at a predetermined angle such that the unnecessary light incident on the flange portion 28 through the second surface 28b exits through the upstream side reflection surface 23 of the optical element 21 along the path L2 described above. The first surface 28a and the second surface 28b of the flange portion 28 may be used for positioning the lens mirror array 20. In this case, since the arrangement angle is determined depending on a predetermined angle, the paths L1 and L2 of the unnecessary light passing through the flange portion 28 are controlled by adjusting the arrangement angle of the fourth surface 28d.

Most of light passed through the slit 56 in the light emitted from the light source 53 is incident on the incidence side lens surface 22 of the optical element 21. However, as described above, a part of the light passed through the slit 56 may be incident on the first surface 28a and/or the second surface 28b of the flange portion 28. The light incident on the flange portion 28 becomes stray light. Accordingly, in the embodiment, the shape of the fourth surface 28d of the flange portion 28 is adjusted such that the stray light is guided to a position deviating from the slit 57. That is, the fourth surface 28d is arranged at an angle at which the light incident on the flange portion 28 through the first surface 28a of the flange portion 28 is refracted and the light incident on the flange portion 28 through the second surface 28b is reflected by total reflection.

Hereinafter, focusing on one optical element 21, an example of the shape of the fourth surface 28d of the flange portion 28 will be described in more detail with reference to FIGS. 9 and 10. In the above description, the case where the protective glass 54 is provided on the lens mirror array 20 side of the slit 57 of the support 51 of the exposure device 50K is described. Here, however, a case where the protective glass 54 is provided on the photoconductive drum 31K side of the support 51 will be described.

Figure 9:
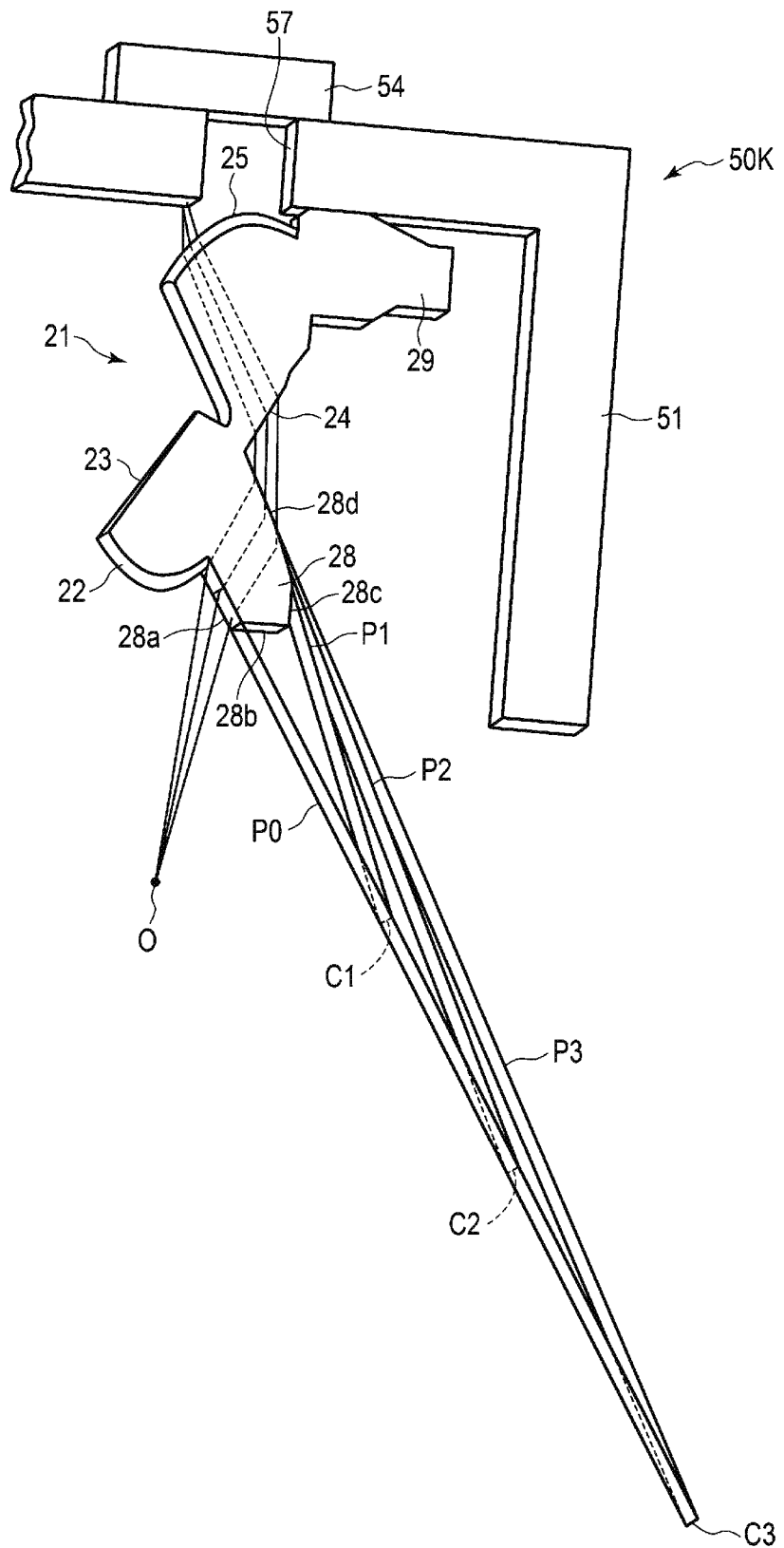
FIG. 9 is a diagram illustrating a shape and an angle of a surface of a flange portion of the lens mirror array of FIG. 6.
Figure 10:
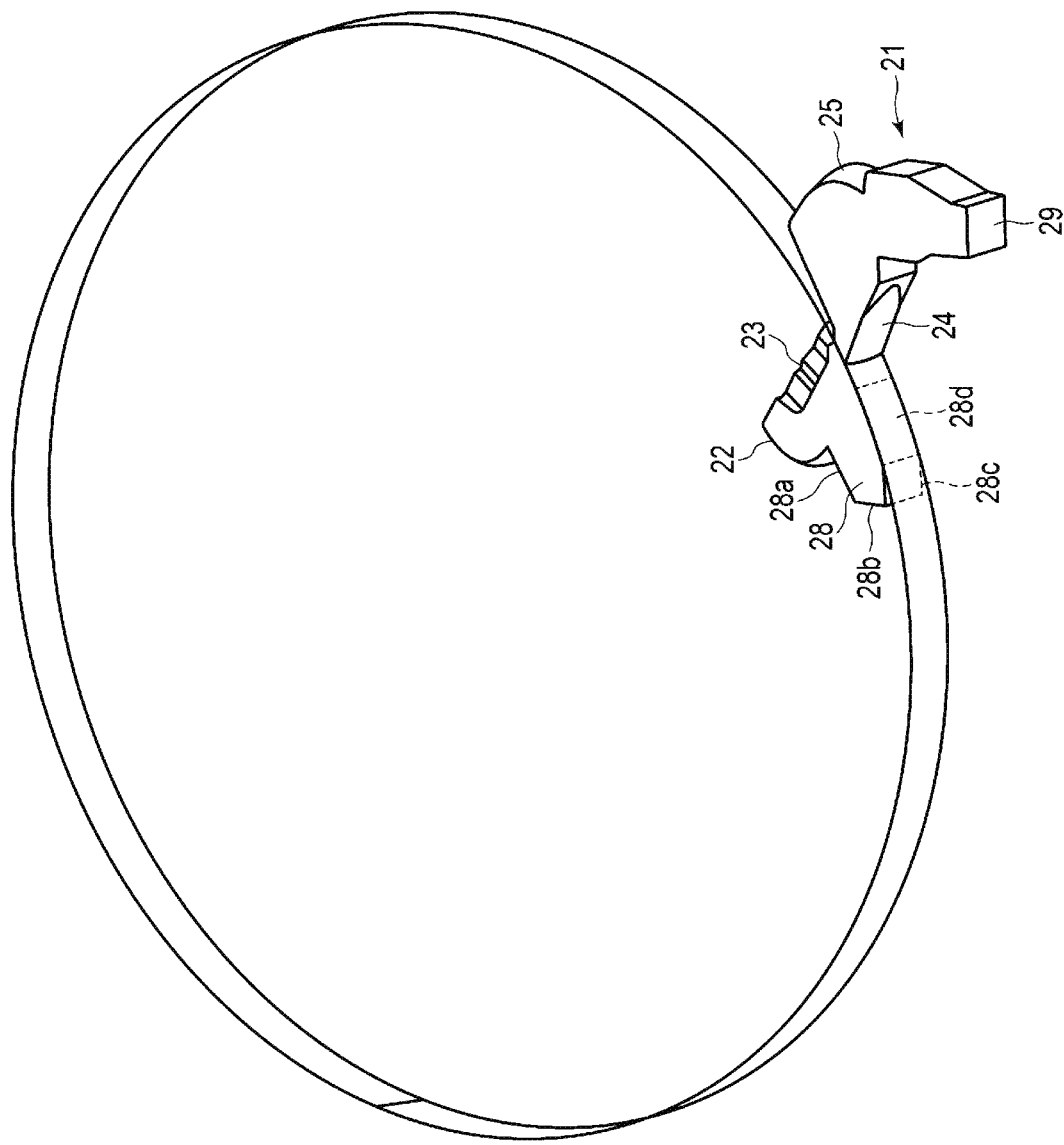
FIG. 10 is a diagram illustrating the shape and the angle of the surface of the flange portion together with FIG. 9.

For example, as illustrated in FIG. 10, the fourth surface 28d of the flange portion 28 of the lens mirror array 20 according to the embodiment froms a part of an imaginary cylindrical surface that is outwardly convex with respect to the flange portion 28. On the other hand, the first surface 28a of the flange portion 28 on which light is incident is a flat surface. In addition, as illustrated in FIG. 9, the fourth surface 28d is arranged at an angle at which contact surfaces P1, P2, and P3 in contact with the fourth surface 28d in any line in a circumferential direction parallel to an axis of the imaginary cylinder intersect with a surface P0 on a distal side (C1, C2, C3) of the flange portion 28, the surface P0 obtained by extending the first surface 28a in a distal direction of the flange portion 28.

For example, as illustrated in FIG. 9, light incident on the first surface 28a of the flange portion 28 from the object point O is refracted from the first surface 28a, passes through the flange portion 28, is refracted from the fourth surface 28d, and exits to the downstream side reflection surface 24 through the flange portion 28. At this time, it is necessary to set the angle of the fourth surface 28d (the angle of the contact surface of the fourth surface 28d at a position where light passes) such that the light incident again on the optical element 21 through the downstream side reflection surface 24 is focused on the exit side lens surface 25 and is emitted to the support 51 at a position deviating from the slit 57.

Therefore, in the embodiment, the refraction angle of light refracted from the fourth surface 28d is made to gradually vary depending on the position where light passes. That is, the shape and the arrangement angle of the fourth surface 28d is set as described above such that an angle at which light incident on the first surface 28a at a position distant from the incidence side lens surface 22 is refracted from the fourth surface 28d is greater than an angle at which light incident on the first surface 28a at a position close to the incidence side lens surface 22 is refracted from the fourth surface 28d.

In addition, instead of the cylindrical surface, the fourth surface 28d may be configured as a surface (not illustrated) obtained by connecting a plurality of flat surfaces in a cylindrical shape. Even in this case, the flat surfaces configuring the fourth surface 28d may be arranged while making the angle to gradually vary. As a result, an refraction angle of the fourth surface 28d at which light incident on the first surface 28a at a position distant from the incidence side lens surface 22 is refracted from the fourth surface 28d can be made to be greater than an refraction angle of the fourth surface 28d at which light incident on the first surface 28a at a position close to the incidence side lens surface 22 is refracted from the fourth surface 28d.

On the other hand, as illustrated in FIG. 7, the light incident on the flange portion 28 through the second surface 28b is reflected from the fourth surface 28d in a direction indicated by solid line L2 and is directed in a direction of the upstream side reflection surface 23. Accordingly, according to the embodiment, the light incident on the flange portion 28 through the second surface 28b can be reflected in the direction of the upstream side reflection surface 23 and does not become stray light that exits from the lens mirror array 20 through the exit side lens surface 25.

As described above, in the lens mirror array 20 according to the embodiment, the shape and the arrangement angle of the fourth surface 28d of the incidence side flange portion 28 are adjusted to be the predetermined shape and the predetermined angle. Therefore, problems arising when undesired light incident through the flange portion 28 exits through the slit 57 can be prevented. That is, when the lens mirror array 20 according to the embodiment is incorporated into the exposure devices 50Y, 50M, 50C, and 50K as illustrated in FIG. 4, the stray light can be prevented from being emitted to the surfaces of the photoconductive drums 31Y, 31M, 31C, and 31K. Therefore, an adverse effect on the electrostatic latent images formed on the photoconductive drums 31Y, 31M, 31C, and 31K can be prevented, and deterioration in image quality can be prevented.

In addition, for example, when the lens mirror array 20 according to the embodiment is incorporated into the document reading device 10 of the copying machine 100 as illustrated in FIG. 2, the stray light guided through the flange portion 28 can be prevented from being incident on the image sensor 15. Therefore, deterioration in the image quality of an image read by the document reading device 10 can be suppressed.

Further, when the lens mirror array 20 according to the embodiment is incorporated into the printer 200 as illustrated in FIG. 5, the stray light can be prevented from being emitted to the photosensitive surface of the photosensitive medium 201. Therefore, noise can be prevented from being included in the electrostatic latent image formed on the photosensitive surface of the photosensitive medium 201, and deterioration in image quality can be prevented.

Second Embodiment

Figure 11:
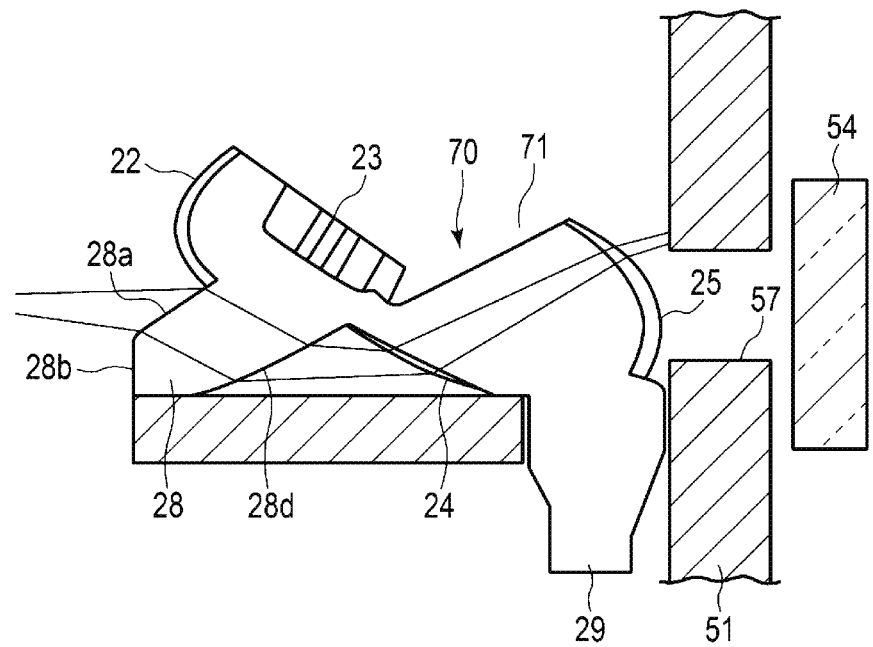
FIG. 11 is a schematic diagram illustrating a path of light incident on a flange portion of a lens mirror array according to a second embodiment.
Figure 12:
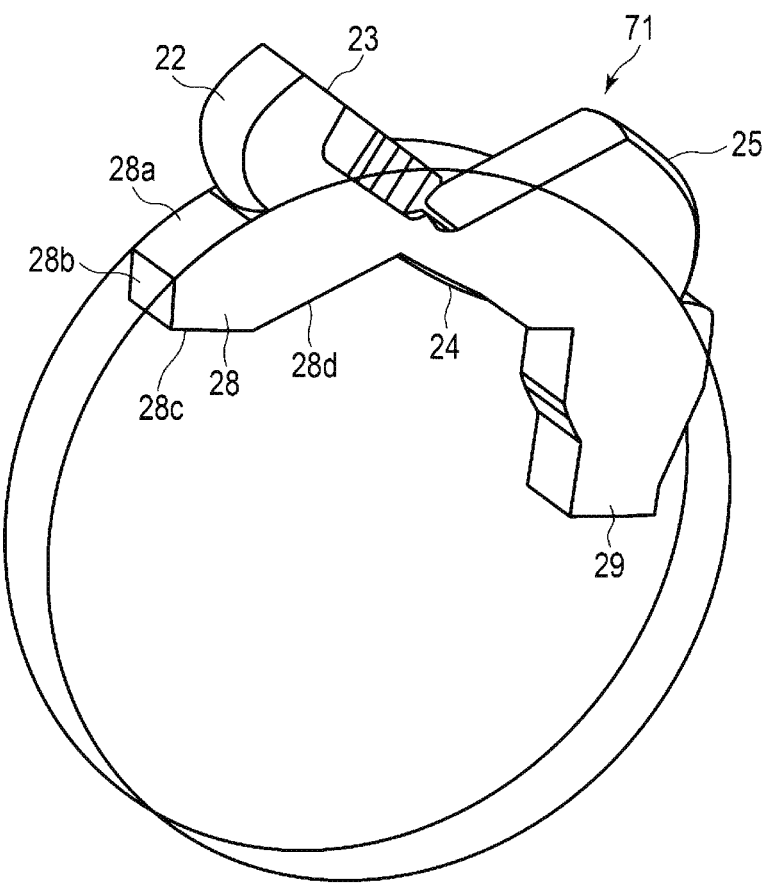
FIG. 12 is a diagram illustrating a shape of a surface of the flange portion of the lens mirror array of FIG. 11.

Hereinafter, a lens mirror array 70 according to a second embodiment will be described with reference to FIGS. 11 and 12. FIG. 11 is a schematic diagram illustrating a path of unnecessary light passing through the incidence side flange portion 28 of each of an optical element 71 of the lens mirror array 70. FIG. 12 is a diagram illustrating the shape of the first surface 28a of the flange portion 28 of the optical element 71.

As illustrated in FIG. 12, in each of the optical elements 71 of the lens mirror array 70 according to the embodiment, the first surface 28a of the incidence side flange portion 28 is outwardly curved in an arc shape, and the fourth surface 28d is formed as a flat surface. That is, the first surface 28a forms a part of the cylindrical surface. Other structures are substantially the same as those of the optical element 21 according to the first embodiment. Accordingly, here, the components having the same functions as those of the first embodiment will be represented by the same reference numerals, and the detailed description thereof will not be repeated.

In the embodiment, a contact surface in contact with the first surface 28a at any position where light is incident on the first surface 28a intersects a flat surface extending from the fourth surface 28d on a distal side of the flange portion 28. This way, by arranging the first surface 28a to be curved at a predetermined angle, as illustrated in FIG. 11, substantially the entire unnecessary light incident on the flange portion 28 through the first surface 28a can be guided to a position deviating from the slit 57 of the support 51. That is, the unnecessary light can be guided to the light shielding member for preventing the unnecessary light from reaching an image surface.

In the embodiment, the first surface 28a may be formed by connecting a plurality of flat surfaces in a cylindrical shape as in the first embodiment. Even in this case, by arranging the fourth surface 28d obtained by connecting a plurality of flat surfaces in a cylindrical shape at a predetermined angle, the unnecessary light incident on the flange portion 28 through the first surface 28a can be guided to a position deviating from the slit 57 as in the case where the fourth surface 28d is formed as the cylindrical surface. That is, the unnecessary light can be guided to the light shielding member for preventing the unnecessary light from reaching an image surface.

Third Embodiment

Figure 13:
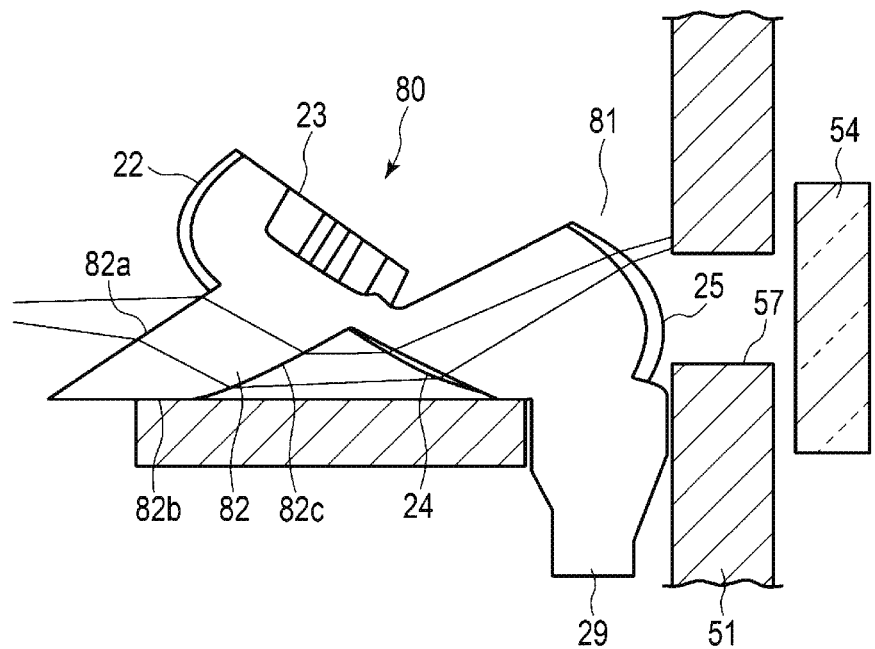
FIG. 13 is a schematic diagram illustrating a path of light incident on a flange portion of a lens mirror array according to a third embodiment.
Figure 14:
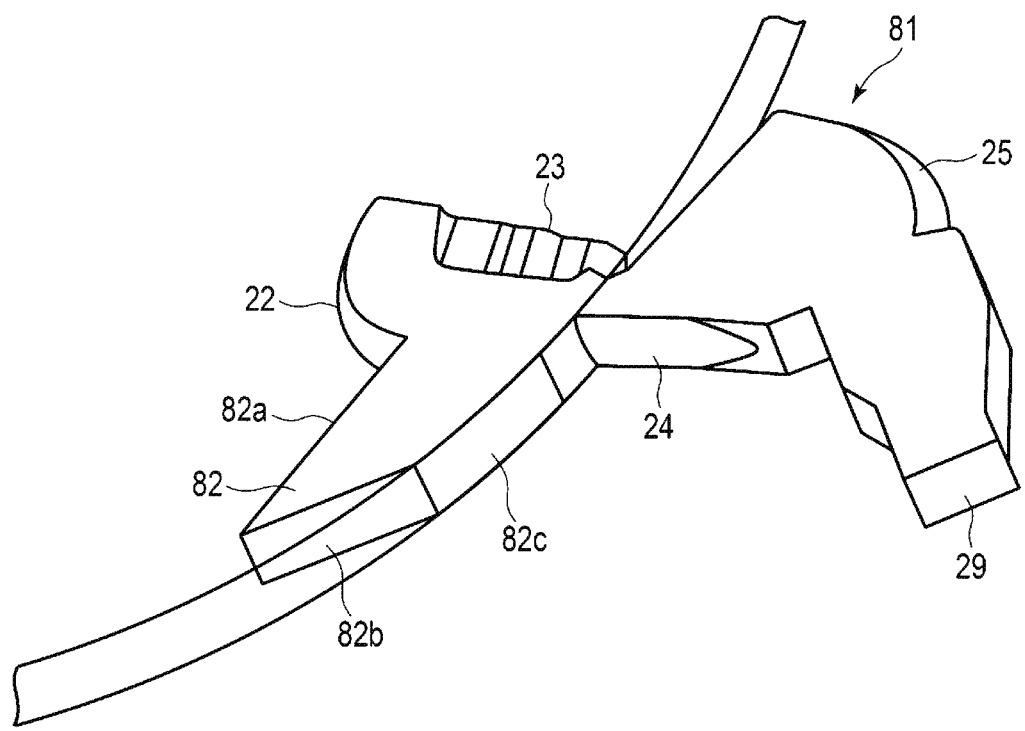
FIG. 14 is a diagram illustrating a shape of a surface of the flange portion.

Hereinafter, a lens mirror array 80 according to a third embodiment will be described with reference to FIGS. 13 and 14. FIG. 13 is a schematic diagram illustrating a path of unnecessary light passing through an incidence side flange portion 82 (protrusion portion) of each of optical elements 81 of the lens mirror array 80. FIG. 14 is a diagram illustrating the shapes of a first surface 82a (first surface), a second surface 82b, and a third surface 82c (second surface) of the flange portion 82 of the optical element 81.

In each of the optical elements 81 of the lens mirror array 80 according to the embodiment, as illustrated in FIG. 14, a surface shape of the incidence side flange portion 82 is different from the surface shape of the flange portion 28 of the optical element 21 according to the first embodiment. Other structures than the flange portion 82 are substantially the same as those of the optical element 21 according to the first embodiment. Accordingly, here, the components having the same functions as those of the first embodiment will be represented by the same reference numerals, and the detailed description thereof will not be repeated.

The optical element 81 according to the embodiment includes one flat first surface 82a instead of the first surface 28a and the second surface 28b of the flange portion 28 of the optical element 21 according to the first embodiment. In other words, the flange portion 82 of the optical element 81 according to the embodiment does not have a surface corresponding to the second surface 28b of the optical element 21. The second surface 82b has the same function as that of the third surface 28c of the flange portion 28 of the optical element 21, and the third surface 82c has the same function as that of the fourth surface 28d of the flange portion 28 of the optical element 21.

The first surface 82a of the flange portion 82 is a surface continuous to the incidence side lens surface 22 and is a surface on which unnecessary light may be incident. As illustrated in FIG. 14, the third surface 82c of the flange portion 82 may configure a part of the cylindrical surface. In the embodiment, a flat surface extending from the first surface 82a intersects a contact surface in contact with the third surface 82c at any position where light exits through the third surface 82c on a distal side of the flange portion 82. This way, by arranging the third surface 82c to be curved at a predetermined angle, as illustrated in FIG. 13, unnecessary light incident on the flange portion 82 through the first surface 82a can be guided to a position deviating from the slit 57 of the support 51. That is, the unnecessary light can be guided to the light shielding member for preventing the unnecessary light from reaching an image surface.

In the embodiment, the third surface 82c may be formed by connecting a plurality of flat surfaces in a cylindrical shape as in the first embodiment. Even in this case, by arranging the third surface 82c obtained by connecting a plurality of flat surfaces in a cylindrical shape at a predetermined angle, the unnecessary light incident on the flange portion 82 through the first surface 82a can be guided to a position deviating from the slit 57 as in the case where the third surface 82c is formed as the cylindrical surface. That is, the unnecessary light can be guided to the light shielding member for preventing the unnecessary light from reaching an image surface.

Fourth Embodiment

Figure 15:
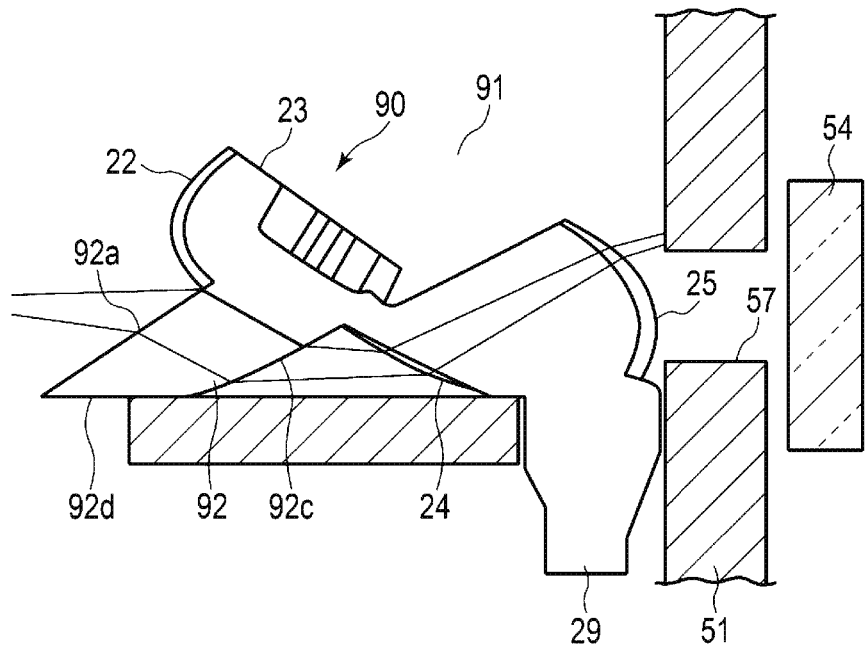
FIG. 15 is a schematic diagram illustrating a path of light incident on a flange portion of a lens mirror array according to a fourth embodiment.
Figure 16:
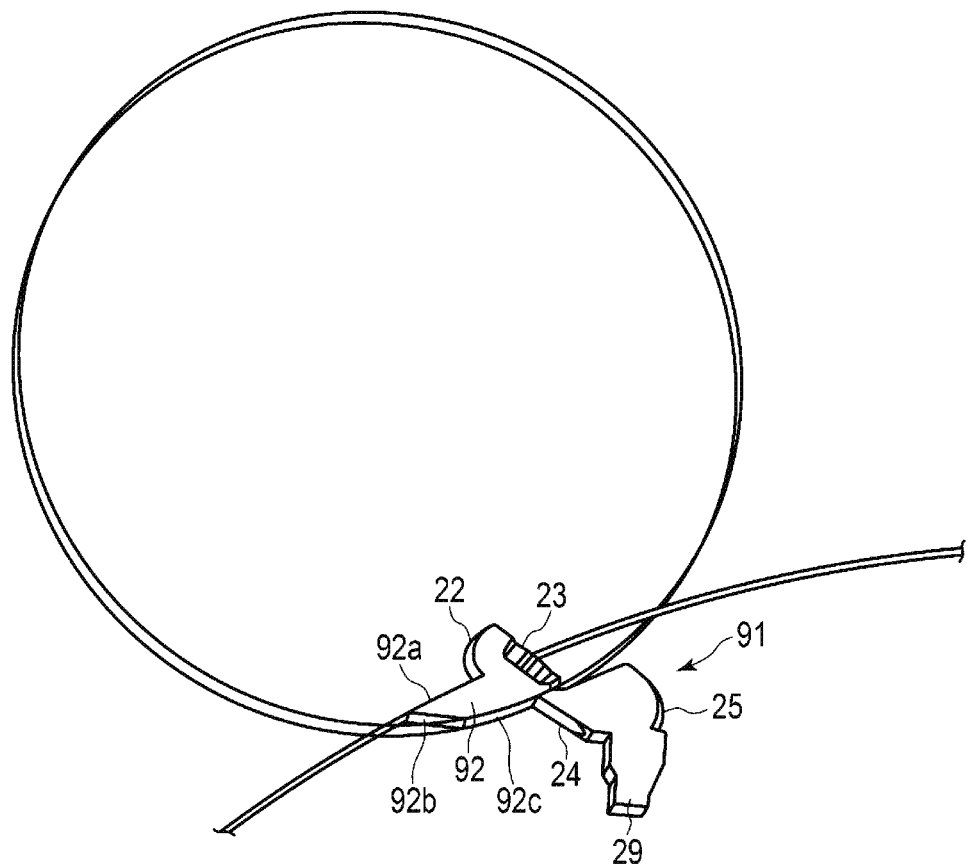
FIG. 16 is a diagram illustrating a shape of a surface of the flange portion.

Hereinafter, a lens mirror array 90 according to a fourth embodiment will be described with reference to FIGS. 15 and 16. FIG. 15 is a schematic diagram illustrating a path of unnecessary light passing through an incidence side flange portion 92 (protrusion portion) of each of optical elements 91 of the lens mirror array 90. FIG. 16 is a diagram illustrating the shapes of a first surface 92a (first surface), a second surface 92b, and a third surface 92c (second surface) of the flange portion 92 of the optical element 91.

In each of the optical elements 91 of the lens mirror array 90 according to the embodiment, as illustrated in FIG. 16, the first surface 92a of the incidence side flange portion 92 is curved in a cylindrical shape. Other structures are substantially the same as those of the optical element 21 according to the third embodiment. That is, the second surface 92b of the flange portion 92 has the same function as that of the second surface 82b of the flange portion 82 of the optical element 81, and the third surface 92c has the same function as that of the third surface 82c of the flange portion 82 of the optical element 81. Accordingly, here, the detailed description of the components having the same functions as those of the third embodiment will not be repeated.

The first surface 92a of the flange portion 92 is a surface continuous to the incidence side lens surface 22 and is a surface on which unnecessary light may be incident. In the embodiment, a contact surface of the first surface 92a at any position where unnecessary light is incident on the first surface 92a and a contact surface of the third surface 92c at a position where the unnecessary light exits through the third surface 92c intersect each other on a distal side of the flange portion 92. This way, by arranging the first surface 92a and the third surface 92c to be curved at a predetermined angle, as illustrated in FIG. 15, unnecessary light incident on the flange portion 92 through the first surface 92a can be guided to a position deviating from the slit 57 of the support 51. That is, the unnecessary light can be guided to the light shielding member for preventing the unnecessary light from reaching an image surface.

In the embodiment, the first and third surfaces 92a and 92c may be formed by connecting a plurality of flat surfaces in a cylindrical shape as in the first embodiment. Even in this case, by arranging the first and third surface 92a and 92c obtained by connecting a plurality of flat surfaces in a cylindrical shape at a predetermined angle, the unnecessary light incident on the flange portion 92 through the first surface 92a can be guided to a position deviating from the slit 57. That is, the unnecessary light can be guided to the light shielding member for preventing the unnecessary light from reaching an image surface.

In addition, one of the first surface 92a and the third surface 92c may also be configured as a concave surface that is inwardly concave with respect to the flange portion 92. In either case, the shapes and the angles of the first surface 92a and the third surface 92c may be set such that a contact surface of the first surface 92a at any position where unnecessary light is incident on the first surface 92a and a contact surface of the third surface 92c at a position where the unnecessary light exits through the third surface 92c intersect each other on a distal side of the flange portion 92.

As described above, according to the embodiment, by adjusting the shape and the angle of the surface of the flange portion to be the predetermined shape and the predetermined angle, unnecessary light incident on the flange portion can be prevented from exiting through the slit as stray light, and an adverse effect of stray light can be eliminated.

In addition, in the embodiment, by adjusting the shape and the arrangement angle of the surface of the flange portion to be the appropriate shape and the appropriate angle, stray light can be reliably shielded even when the attachment position accuracy of the lens mirror array 20 is low or when the width of the slit for shielding stray light deviates from a set value. Therefore, by using the lens mirror array 20 according to the embodiment, it is not necessary to set the attachment position accuracy of the lens mirror array 20 to be high, it is not necessary to form the width of the slit with high accuracy, and the manufacturing costs of the device can be suppressed to be low.

While certain embodiments have been described, these embodiments have been presented by way of example only, and are not intended to limit the scope of inventions. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

For example, in the embodiment, the case where the surface of the flange portion of the optical element of the lens mirror array is the cylindrical surface is described. However, the surface of the flange portion is not necessarily curved in an arc shape. For example, as in each of the embodiments, the surface of the flange portion may be configured with a plurality of continuous flat surfaces, or may be formed as a curved surface having an elliptical shape or an oval shape in cross-section.

What is claimed is:

1. A lens mirror array comprising:
a plurality of transparent optical elements integrally connected to each other in one direction, each of the plurality of transparent optical elements including:
an incidence surface on which effective light is incident;
a protrusion portion having a surface on which unnecessary light is incident, wherein the surface is continuous to the incidence surface; and
an exit surface through which the effective light and at least a portion of the unnecessary light exits, the exit surface configured to be positioned proximate an opening;
wherein the surface of the protrusion portion is arranged at an angle at which the unnecessary light incident on the protrusion portion is guided to a position deviating from the opening such that the opening (i) allows transmission of the effective light that exits through the exit surface and (ii) blocks transmission of the unnecessary light that exits through the exit surface.

2. The lens mirror array of claim 1, wherein the surface of the protrusion portion is a first surface on which the unnecessary light is incident on the protrusion portion, wherein the protrusion portion has a second surface through which the unnecessary light exits from the protrusion portion.

3. The lens mirror array of claim 2, wherein the first surface and the second surface have a shape and an angle such that a contact surface of the first surface at any position where the unnecessary light passes through the first surface and a contact surface of the second surface at a position where the unnecessary light exits from the second surface intersect each other on a distal side of the protrusion portion.

4. The lens mirror array of claim 3, wherein at least one of the first surface and the second surface has a shape and an angle such that an intersection position between the contact surface of the first surface at a position where the unnecessary light is incident on the first surface of the protrusion portion and the contact surface of the second surface at a position where the unnecessary light exits from the second surface approaches the protrusion portion as the position where the unnecessary light is incident on the first surface becomes more distant from the incidence surface.

5. The lens mirror array of claim 2, wherein at least one of the first surface or the second surface of the protrusion portion is curved.

6. The lens mirror array of claim 5, wherein the first surface and the second surface are curved.

7. The lens mirror array of claim 6, wherein the first surface has a first curvature and the second surface has a second, different curvature.

8. The lens mirror array of claim 5, wherein the at least one of the first surface or the second surface is cylindrical shaped.

9. The lens mirror array of claim 5, wherein the first surface is curved and the second surface is flat.

10. The lens mirror array of claim 5, wherein the first surface is flat and the second surface is curved.

11. The lens mirror array of claim 2, wherein at least one of the first surface or the second surface of the protrusion portion includes a plurality of flat surfaces arranged in a cylindrical shape.

12. The lens mirror array of claim 2, wherein the first surface and the second surface are flat.

13. The lens mirror array of claim 2, wherein the protrusion portion includes a third surface on which the unnecessary light is incident, wherein a first portion of the unnecessary light passing through the first surface is refracted by the second surface, and wherein a second portion of the unnecessary light passing through the third surface is reflected by the second surface.

14. A lens mirror array comprising:
a plurality of transparent optical elements integrally connected to each other in one direction, each of the plurality of transparent optical elements including:
a first lens surface on which effective light is incident;
a first reflection surface from which the effective light incident on the first lens surface is reflected;
a second reflection surface from which the effective light reflected from the first reflection surface is reflected;
a second lens surface through which the effective light reflected from the second reflection surface exits; and
a protrusion portion having a first surface continuous to the first lens surface and a second surface continuous to the second reflection surface;
wherein the first surface and the second surface have a shape and are angled such that unnecessary light incident on the protrusion portion through the first surface is refracted from the second surface to exit from the protrusion portion, the unnecessary light exiting through the second surface is incident on and refracted from the second reflection surface, the unnecessary light refracted from the second reflection surface is refracted to exit through the second lens surface, and the unnecessary light exiting through the second lens surface is guided to a position deviating from an opening that allows transmission of the effective light exiting through the second lens surface.

15. The lens mirror array of claim 14, wherein at least one of the first surface or the second surface of the protrusion portion is curved.

16. The lens mirror array of claim 14, wherein at least one of the first surface or the second surface of the protrusion portion includes a plurality of flat surfaces arranged in a cylindrical shape.

17. The lens mirror array of claim 14, wherein the protrusion portion includes a third surface on which the unnecessary light is incident, wherein a first portion of the unnecessary light passing through the first surface is refracted by the second surface to the second reflection surface, and wherein a second portion of the unnecessary light passing through the third surface is reflected by the second surface to and exits through the first reflection surface.

18. An optical element for a lens mirror array, the optical element comprising:
a first lens surface positioned to receive effective light;
a first reflection surface positioned to receive the effective light from the first lens surface and reflect the effective light;
a second reflection surface positioned to receive from the effective light reflected from the first reflection surface and reflect the effective light;
a second lens surface positioned to receive the effective light reflected from the second reflection surface; and
a protrusion positioned between the first lens surface and the second reflection surface, the protrusion having a first surface extending from a first edge of the first lens surface and a second surface extending from a second edge of the second reflection surface.

19. The optical element of claim 18, wherein stray light incident on the protrusion through the first surface is refracted from the second surface to exit from the protrusion, the stray light exiting through the second surface is incident on and refracted from the second reflection surface, the stray light refracted from the second reflection surface is refracted to exit through the second lens surface, and the stray light exiting through the second lens surface is guided to a position deviating from an opening that allows transmission of the effective light exiting through the second lens surface.

20. The optical element of claim 18, wherein the protrusion includes a third surface, wherein a first portion of stray light passing through the first surface is refracted by the second surface to the second reflection surface, and wherein a second portion of the stray light passing through the third surface is reflected by the second surface to the first reflection surface.

* * * * *